(12) United States Patent
Bhatla et al.

(10) Patent No.: US 8,522,142 B2
(45) Date of Patent: Aug. 27, 2013

(54) ADAPTIVE MEDIA PLAYER SIZE

(75) Inventors: Nikhil Bhatla, Walnut Creek, CA (US);
Matthew Vosburgh, Sunnyvale, CA
(US); Steve Okamoto, San Jose, CA
(US)

(73) Assignee: Google Inc., Mountain View, CA (US)

( * ) Notice: Subject to any disclaimer, the term of this patent is extended or adjusted under 35 U.S.C. 154(b) by 710 days.

(21) Appl. No.: 11/608,662

(22) Filed: Dec. 8, 2006

(65) Prior Publication Data
US 2007/0136685 A1 Jun. 14, 2007

Related U.S. Application Data

(60) Provisional application No. 60/749,011, filed on Dec. 8, 2005.

(51) Int. Cl.
*G06F 3/00* (2006.01)

(52) U.S. Cl.
USPC ........... 715/719; 715/720; 715/721; 715/722; 715/723; 715/800

(58) Field of Classification Search
USPC .......................................... 715/800, 719–723
See application file for complete search history.

(56) References Cited

U.S. PATENT DOCUMENTS

| | | | |
|---|---|---|---|
| 6,456,305 B1 * | 9/2002 | Qureshi et al. ................ | 715/800 |
| 6,538,665 B2 * | 3/2003 | Crow et al. .................... | 715/723 |
| 7,181,691 B2 * | 2/2007 | Sezan et al. ................... | 715/719 |
| 7,549,127 B2 * | 6/2009 | Chasen et al. ................. | 715/788 |
| 7,593,965 B2 * | 9/2009 | Gabriel .................................. | 1/1 |
| 2001/0004417 A1 | 6/2001 | Narutoshi et al. | |
| 2002/0126142 A1 * | 9/2002 | Hodgkinson .................. | 345/719 |
| 2004/0187160 A1 | 9/2004 | Cook et al. | |
| 2006/0236264 A1 * | 10/2006 | Cain et al. ..................... | 715/788 |
| 2007/0094333 A1 * | 4/2007 | Schilling et al. .............. | 709/206 |
| 2008/0066107 A1 * | 3/2008 | Moonka et al. ................. | 725/42 |

FOREIGN PATENT DOCUMENTS

| | | |
|---|---|---|
| EP | 1 460 551 A1 | 9/2004 |
| EP | 1 492 021 A | 12/2004 |
| WO | WO 99/24987 A | 5/1999 |
| WO | WO 99/10329 A | 2/2000 |
| WO | WO 03/043322 A | 5/2003 |

OTHER PUBLICATIONS http://web.archive.org/web/20041206093951/http://www.videolan.org/; VLC User Guide; Dec. 6, 2004.*
"Eyespot Releases Version 2.0 of Online Video Mixing Community at Under the Radar Conference," Jun. 14, 2006, [online] [Retrieved on Jun. 29, 2006] Retrieved from the Internet: <URL: http://www.eyespot.com/press/.>.

(Continued)

*Primary Examiner* — Nicholas Augustine
*Assistant Examiner* — Andres E Gutierrez
(74) *Attorney, Agent, or Firm* — Fenwick & West LLP

(57) ABSTRACT

A user interface and a method are disclosed for viewing digital videos. Responsive to resizing a window, a video region and associated controls are resized so that they remain visible. The video image within the video region is correspondingly resized to maintain the aspect ratio. The location of the video image within the window is independent of scroll events taking place in other regions of the window.

27 Claims, 12 Drawing Sheets

(56) References Cited

OTHER PUBLICATIONS

"Eyespot—Shoot, Mix, and Share Your Video," Mar. 13, 2006 [online] [Retrieved on Jun. 29, 2006] Retrieved from the Internet: <URL: http://www.solutionwatch.com/326/eyespot-shoot-mix-and-share-your-video/>.

"Guitar Prodigy," Video.Yahoo.com, 2007, screenshot, 1 page.

"Jumpcut Makes Movies Simple," MiraVlda Media, Inc., [online] [Retrieved on Jun. 29, 2006] Retrieved from the Internet: <URL: http://www.jumpcut.com/company/>.

Marlowe, C., "Eyespot in the Mix with Legal Video Mash-Ups," Washingtonpost.com, Jun. 18, 2006, [online] [Retrieved on Jun. 29, 2006] Retrieved from the Internet: <URL: http://www.washingtonpost.com/wp-dyn/content/article/2006/06/18/AR2006061800966.html>.

Robinson, D., "Jumpcut: Video Editing on the Web," Flashinsider, Apr. 6, 2006, [online] [Retrieved on Jun. 29, 2006] Retrieved from the Internet: <URL: http://www.flahsinsider.com/2006/04/06/jumpcut-videoediting-on-the-web/>.

"The Chad Invades American Idol—Part 2," YouTube.com, 2007, screenshot, 1 page.

"VideoEgg: About Us," VideoEgg, Inc., 2006 [online] [Retrieved on Jun. 29, 2006] Retrieved from the Internet: <URL: http://www.videoegg.com/general/about>.

"VideoEgg Offers New Video Upload Service," About, Inc., Sep. 19, 2005 [online] [Retrieved on Jun. 29, 2006] Retrieved from the Internet: <URL: http://desktopvideo.about.com/b/a/203840.htm>.

Walpole, J., et al., "A Player for Adaptive MPEG Video Streaming Over the Internet," 12 pages, Department of Computer Science and Engineering, Oregon Graduate Institute of Science and Technology, Portland, Oregon.

"Working Together with MXF," Pro-MPEG Forum, Sep. 3, 2002, pp. 1-4.

International Search Report and Written Opinion, PCT/US2007/000403, Jun. 29, 2007, 15 pages.

\* cited by examiner

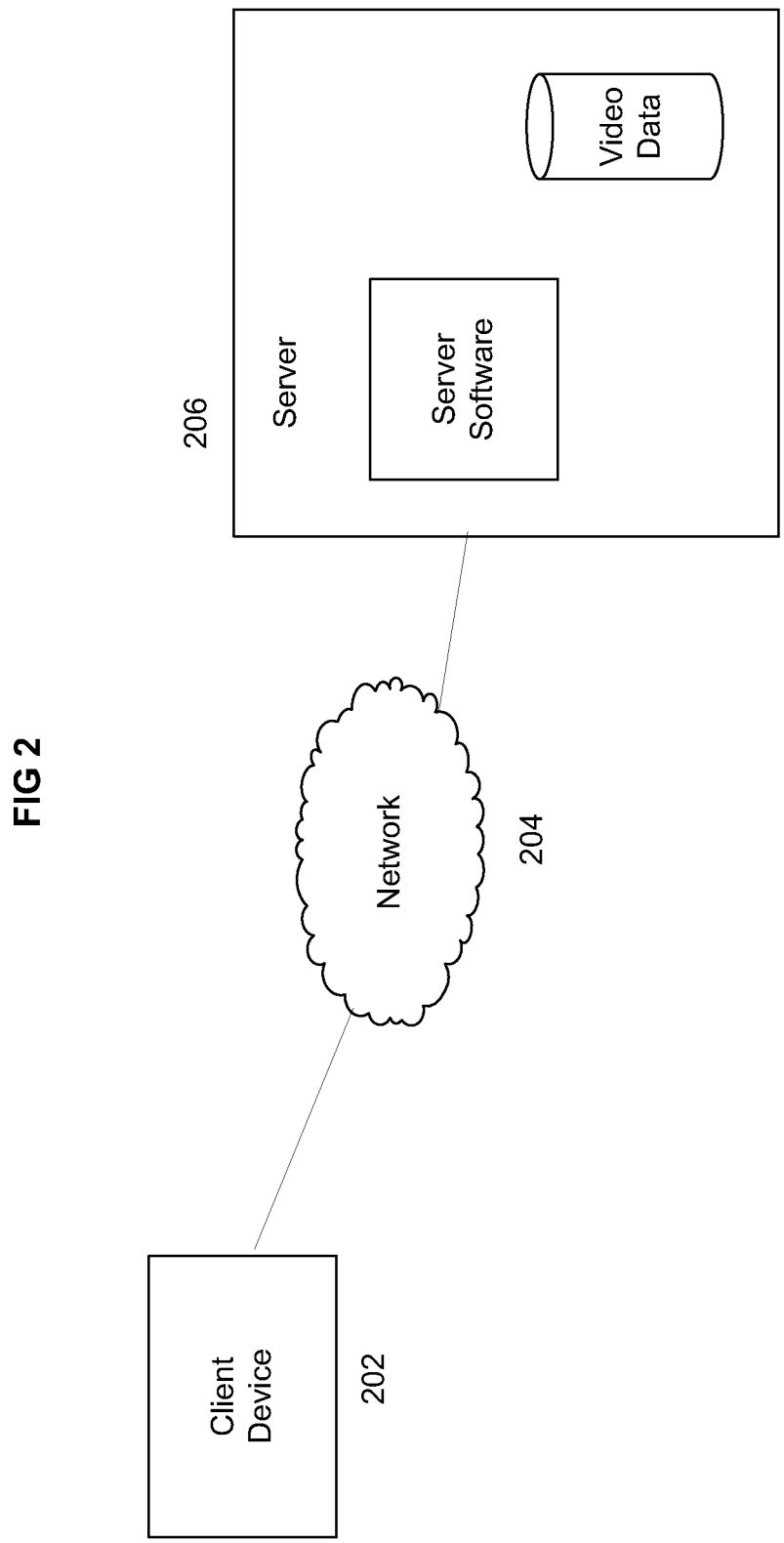

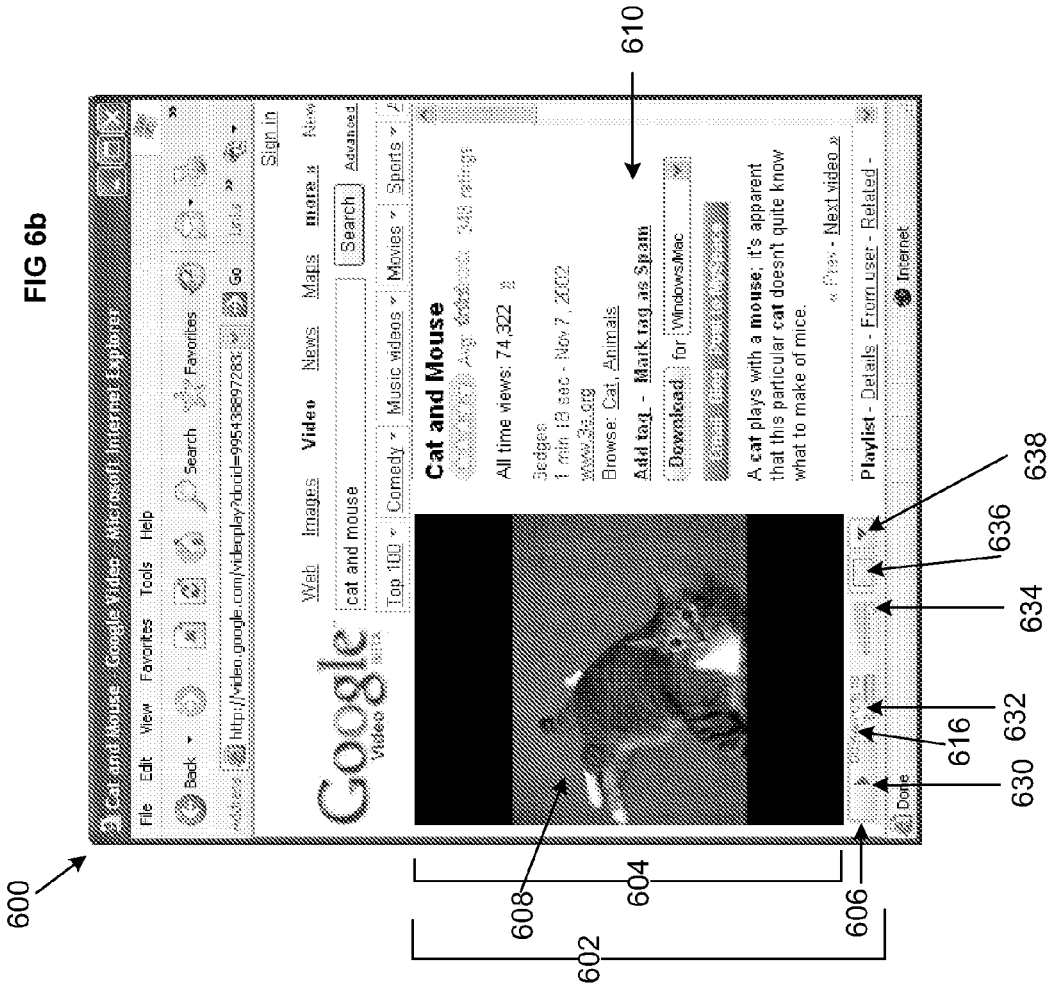

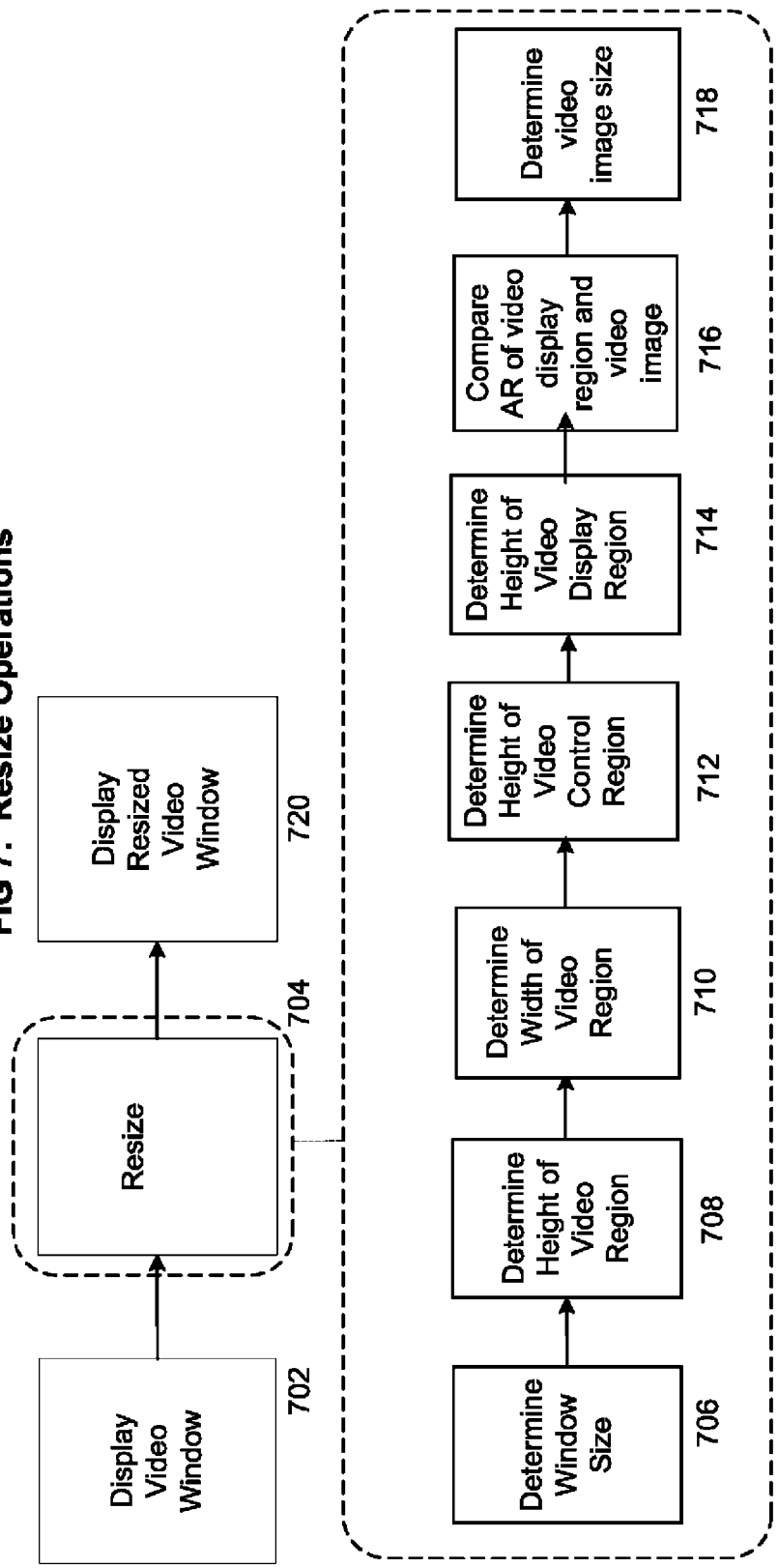

ADAPTIVE MEDIA PLAYER SIZE

CROSS REFERENCE TO RELATED APPLICATIONS

This application claims the benefit of U.S. Provisional Application No. 60/749,011, filed Dec. 8, 2005, which is incorporated by reference in its entirety.

BACKGROUND

1. Field of Art

The present invention generally relates to the field of computer software, and more specifically, to methods of displaying videos within software applications.

2. Description of the Related Art

A number of web sites on the Internet are now available that allow users to post and share digital video content in various ways. However, such existing video sharing web sites fail to provide an effective user interface that enables a user to view and interact with the video content in a convenient manner. For example, some video sharing sites display a video at only a single resolution (e.g., 320×240), and do not to resize the video when the user increases or decreases the size of the browser window, leading to the video not taking advantage of the larger screen size when the window is expanded, or being "cropped" when the window is contracted. Still other systems allow the video to be scrolled along with other content displayed in the window, leading to portions of the video disappearing from view as the user scrolls in the window. Further, other sites do not ensure that the video playback controls, such as play/pause, skip forward, skip back, and progress indicator controls, associated with the video are always visible to the user, thus requiring users to take additional actions, such as scrolling the window, before they can control video playback.

SUMMARY

A user interface provides various features for viewing and interacting with a video. As the video window shrinks or grows, e.g. due to user actions or programmatic events, and available screen space changes, the region for displaying and controlling video continues to be displayed in its entirety rather than being cropped, and the aspect ratio of the video image remains constant. The user can enlarge the video by increasing the size of the window, enabling better display when viewing the video from a greater distance. The buttons and other user interface elements for controlling the playback of the video are persistently displayed despite changes in the user interface state, so that even as portions of the user interface shrink or are scrolled, the user still has quick and convenient onscreen access to the controls. Thus, there is no need for the user to take additional actions, such as scrolling or resizing, to make the controls visible once again. Further, scrolling of other parts of the user interface, such as frames providing additional information about the current video, is enabled independently of the video playback, so the video is fully visible no matter what portion of other information is displayed in the user interface. This allows the user to browse freely through additional information related to the video, without losing sight of the video itself.

In one embodiment, the user interface of a web browser includes a video region containing a video display region for displaying a video image and a video control region for controlling video playback, and a data region for displaying data associated with the current video. When the browser window is resized, either by the user or by programmatic events, the video region is correspondingly resized so as to remain fully visible and maintain the aspect ratio of the video image.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 2 is a block diagram illustrating a system architecture useful in conjunction with the method and user interface described herein.

FIGS. 6a-e show an exemplary user interface with various window sizes.

FIG. 7 is a flowchart illustrating a method of resizing video content.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

The figures and the following description relate to embodiments of the present invention by way of illustration only. It should be noted that from the following discussion, alternative embodiments of the structures and methods disclosed herein will be readily recognized as viable alternatives that may be employed without departing from the principles of the claimed invention.

Overview

The architecture of a video viewing system is now described at the highest level to provide a context for the description of the various embodiments. The client device, i.e. any client computing device capable of displaying video, obtains video data, either from its own local storage or by requesting if from a server, such as a workstation, mainframe computer, networked computer, or processor-based device. In the case of requesting video data from a server, the request travels over a network, such as the Internet, and is received by the server. The server then obtains the desired video data, either from its own local storage or by querying another server system that provides the actual data storage. The server then sends the video data back over the network to the client device, which then displays the video to the user. The video data can be delivered as a single file which the user system then receives in its entirety before starting to display it, or it can be delivered via streaming, so that the user system overlaps the receipt and displaying of the video, displaying only as much as it has currently received. It is within this context that the present invention is described herein.

Figure 1A:
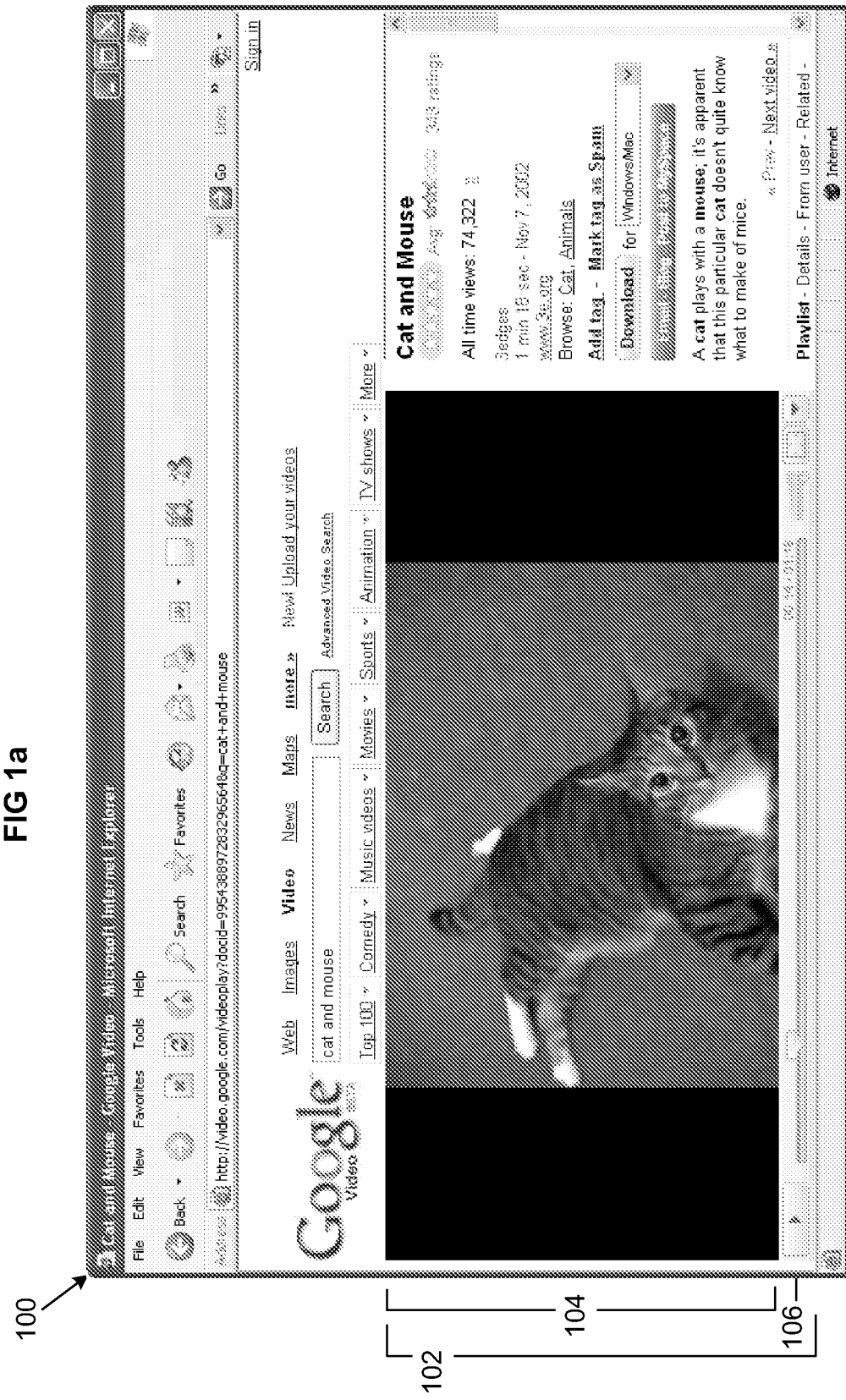
FIGS. 1a-1b illustrate the resizing of elements of a user interface in response to a reduction in window size.
Figure 1B:
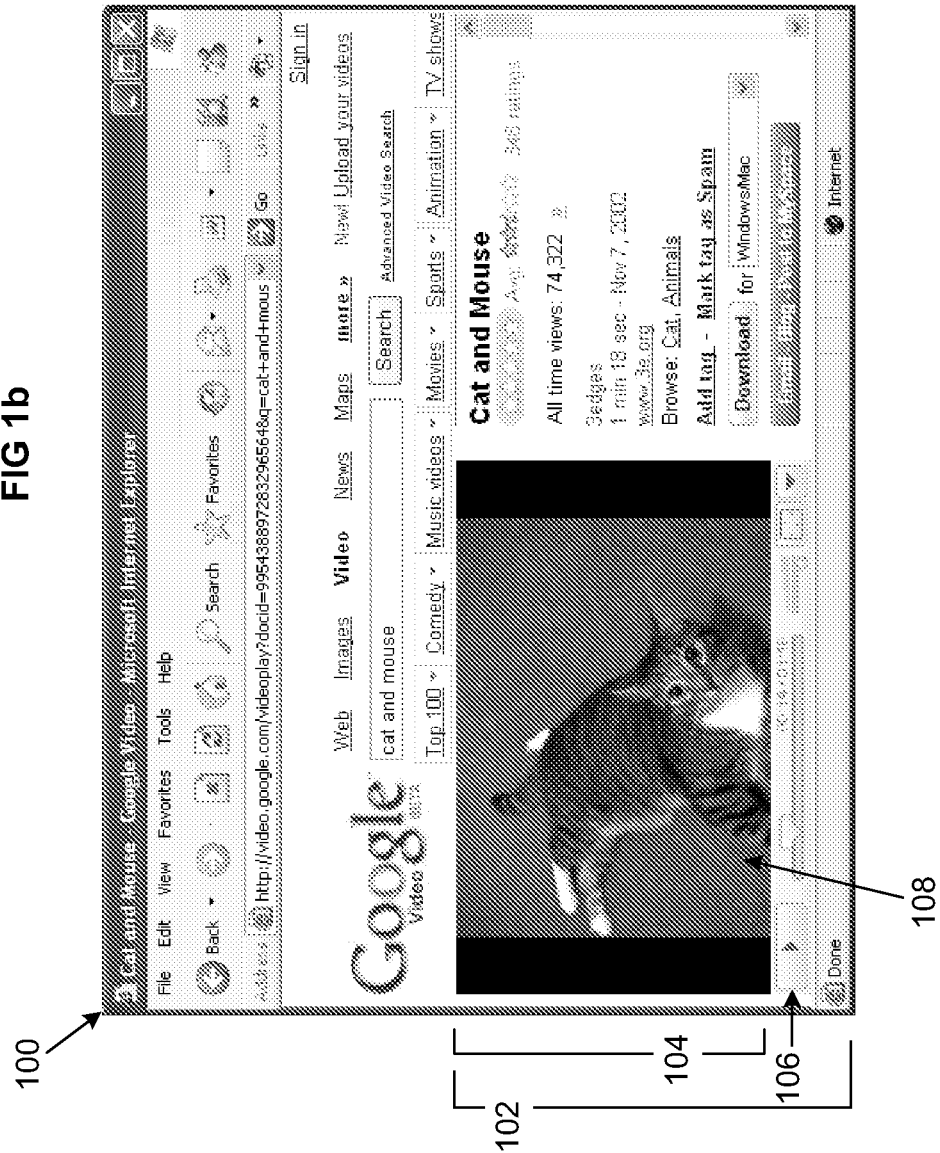

FIGS. 1a and 1b illustrate the resizing of elements of a web browser-based user interface in response to a reduction in browser window size. FIG. 1a represents the window 100 in an initial state, with a video region 102 containing a video display region 104 within which a video image 108 is placed, and a video control region 106 for controlling video playback. FIG. 1b represents the same window 100 after it has been reduced in both width and height. In order to properly respond to the resize event, two primary operations are performed. First, the new size (i.e. width and height) of the video region 102 is calculated. Second, the new sizes of the video display region 104 and the video control region 106 contained within the video region 102 are calculated, and the size of the video image 108 is calculated such that it fits within the video display region 104 and maintains its aspect ratio. In FIG. 1b, these operations have resulted in the video region 102 becoming smaller but still displaying the full video display region 104 and video control region 106 without cropping the video image 108.

FIG. 7 is a flowchart illustrating an example method for resizing a window. First, the browser displays 702 the window in its initial state-that is, already containing a selected video, which may be either paused or playing, but not yet resized. The selected video may be chosen from a list of videos and/or may be the result of a query for video content.

Subsequently, a window resize event is received—by explicit user actions or by the operating system, for example—and in response, the video region and its components are resized 704 as appropriate. The resize 704 involves a series of operations, including calculating the new sizes of the video region 102 and the regions contained within it based on the new window size, and resizing the video image 108 such that it maintains its aspect ratio. In one embodiment, these operations are accomplished by determining 706 the size of the video window, determining 708 the height of the video region within the video window, determining 710 the width of the video region within the video window, determining 712 the height of the video control region within the video region, determining 714 the height of the video display region within the video region, comparing 716 the aspect ratios of the video display region 104 and the video image 108, and determining 718 the video image size based on the comparison of 716, the video display region size, and the video image aspect ratio. Of course, the particular sequence of these determinations can be changed without departing from the invention.

Finally, the resized video window is displayed 720.

System Architecture

One embodiment of a method takes place in the context of a standard client-server architecture, such as a client communicating with a server over the World Wide Web. However, note that though it is typical for the video data to be accessible via the World Wide Web and displayed in a web browser window, it is appreciated that that the present invention is not limited to this situation. Rather, the present invention is independent of the source of the video data and of the particular application used to display that data.

FIG. 2 is a block diagram illustrating a client-server architecture suitable for supporting the method. Such as system comprises a client device 202 and a server 206, communicatively coupled, e.g., by a network 204. The client device 202 can be any type of client computing device capable of displaying video, for example, a device executing a browser application or other application adapted to communicate over Internet related protocols (e.g., TCP/IP and HTTP) and/or display a user interface. The client device 202 is of conventional design according to one embodiment, and includes a processor, an addressable memory, and other conventional features (not illustrated) such as a display, local memory, input/output ports, and a network interface. In other embodiments one or more of the components of the client device 202 may be located remotely and accessed via a network, e.g., 204. The network interface and a network communication protocol provide access to a network 204 and other computers, such as server 206 or third party computers, along with access to the Internet, via a TCP/IP type connection, or to other network embodiments, such as a LAN, a WAN, a MAN, a wired or wireless network, a private network, a virtual private network, via other networks, or other systems allowing for data communication between two or more computing systems. In various embodiments the client 204 may be implemented on a computer running a Microsoft operating system, Mac OS, various flavors of Linux, UNIX, Palm OS, Symbian, and/or other operating systems.

The server 206 provides access to the client device 202 via, for example, its web server software. The server 206 also has access to video data, either storing such data locally or requesting it of other servers. Thus, although the server 206 is depicted in FIG. 2 as a single computer system, it may be implemented as a network of computer processors and associated storage devices. The details of the hardware aspects of servers 206 are well known to those of skill in the art and are not further described herein. Examples of servers 206 are workstations, mainframe computers, networked computers, processor-based devices, and similar types of systems and devices.

Of course, it is appreciated that the present invention is not limited by the details of the particular client-server video sharing architecture. Rather, the present invention relates to a user interface displayed at the client and is thus not dependent on the details of the interaction of the client with other systems, such as the server providing the video data.

Software Architecture

Figure 3:
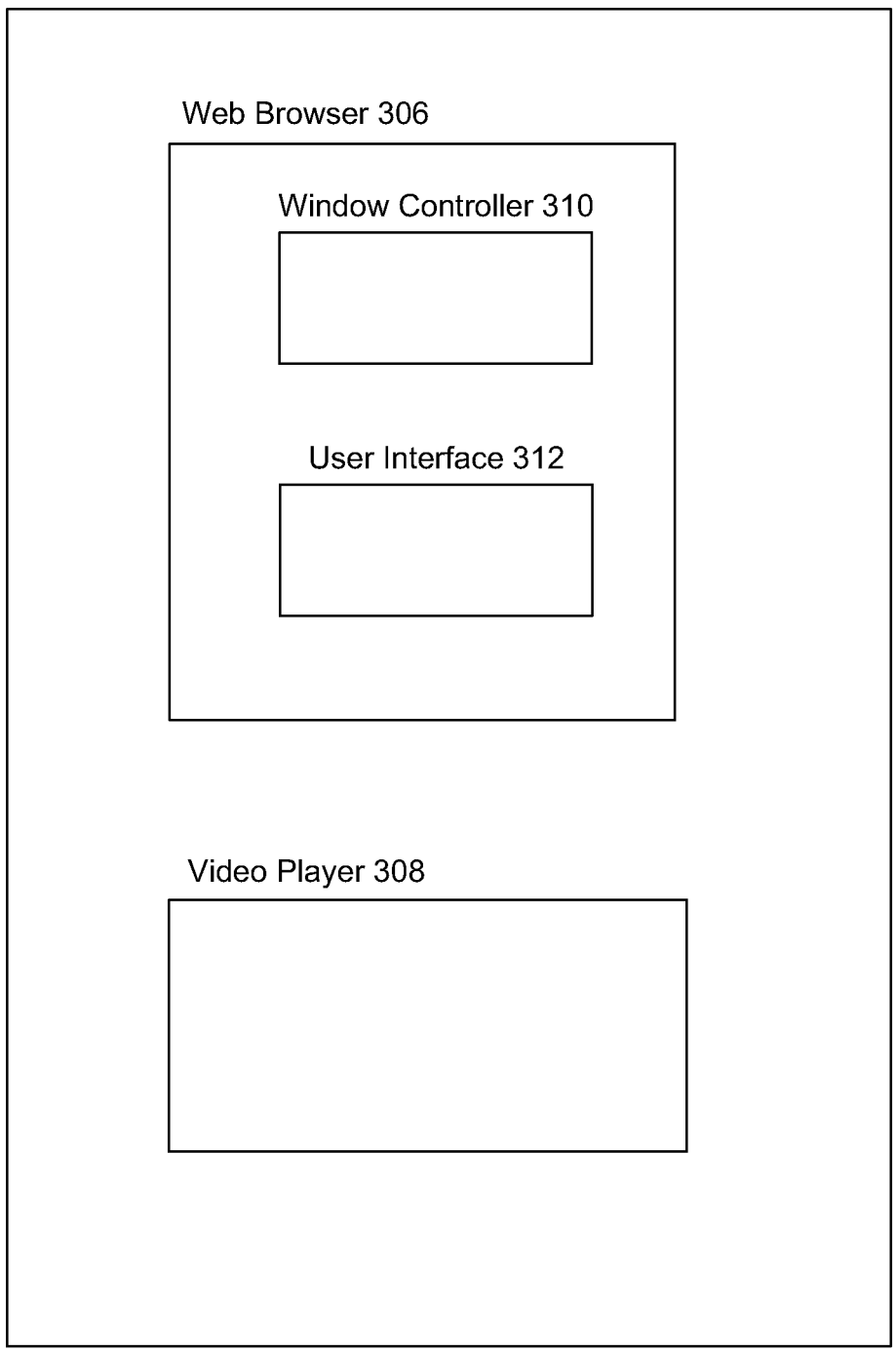
FIG. 3 is a block diagram illustrating a software architecture useful in conjunction with the method and user interface described herein.

FIG. 3 illustrates a software architecture. The embodiment of FIG. 3 involves a client device 202 and the applications on it. Client device 202 includes a web browser 306 and a video player component 308. Web browser 306 further includes a window controller component 310.

Web browser 306 accesses video data held at a web site (not shown) and provides the user interface to display the video.

Video player 308 provides the actual video display; video player 308 can play video for any format(s) including existing formats (e.g., MPEG, Flash, AVI) or formats developed in the future. Video player 308 can be a separate process executable or a browser plug-in that runs in the context and process space of web browser 306.

Window controller 310 is a logical component of web browser 306 that can respond to window events and modify the user interface of web browser 306 accordingly. The window controller 310 is composed of, for example, the HTML, JavaScript, and other programming content residing in the web page provided by the particular web site that provides the video data and stored by web browser 306.

User Interface

Figure 4:
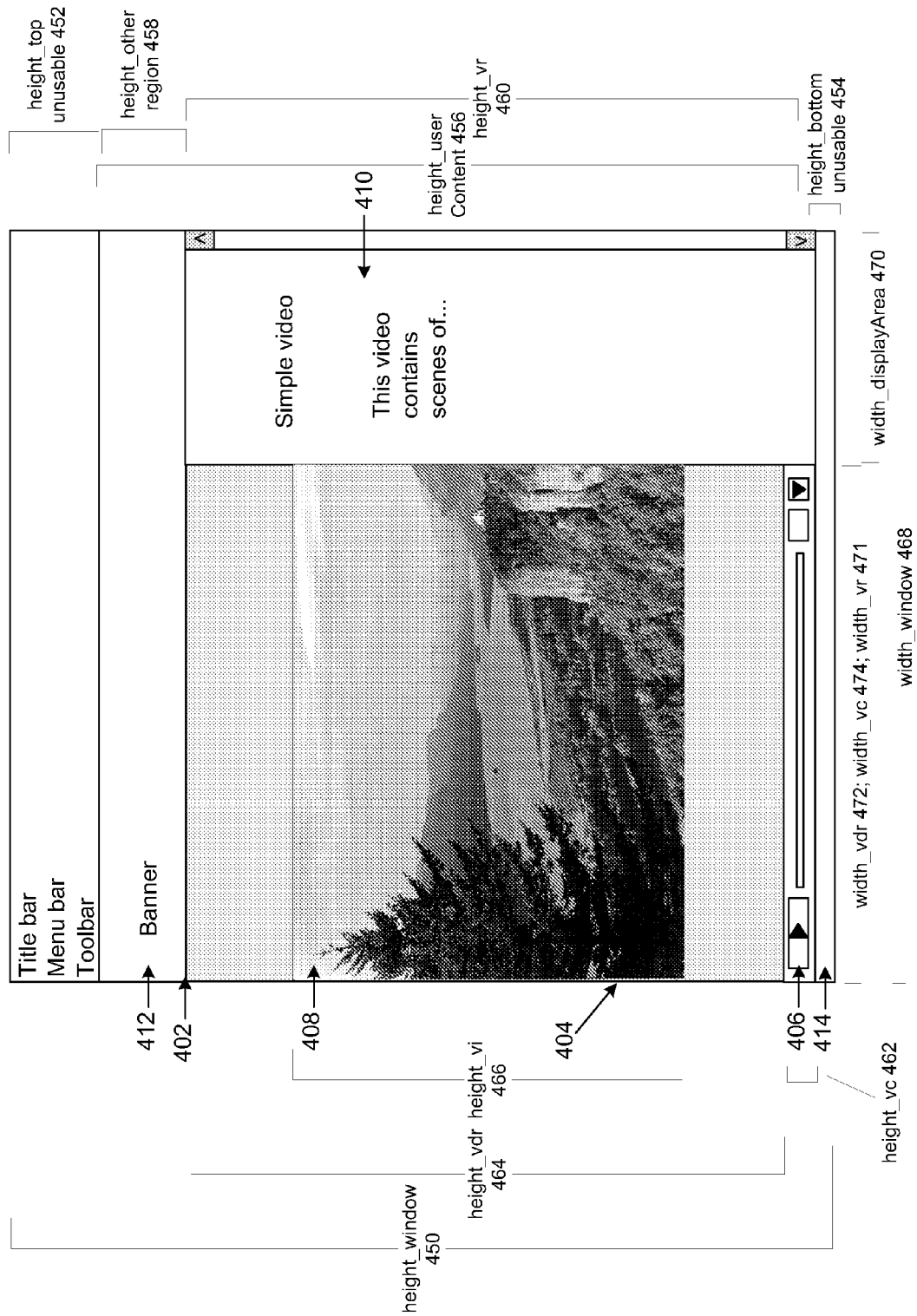
FIG. 4 illustrates a user interface useful in conjunction with the method and user interface described herein.

FIG. 4 is an exemplary user interface, used in applications such as web browser 306, that illustrates the variables that can be considered in one embodiment when calculating the sizes of the various elements of the user interface. These variables are later referenced in the discussion of the size calculations of FIG. 5.

Height_window 450 is the total height of the window belonging to the application, such as a browser.

Height_topUnusable 452 and height_bottomUnusable 454 are the heights of the top and bottom portions, respectively, of the window that are dedicated to general browser functions, and are thus not available for displaying the contents of particular web pages.

Height_userContent 456 is the height of the portion of the window that is available for displaying the contents of particular web pages.

Height_otherRegion 458 is a portion of height_userContent 456 that is directly above or below the video region.

Height_vr 460 is the height of the video region, the portion of the window that contains the primary video-related UI elements.

Height_vc 462 is a constant height, fixed at a value previously chosen by the web page designer as the height for the video controls.

Height_vdr 464 is the height of the video display region, which represents the portion of the video region not occupied by the video controls.

Height_vi 466 is the height of the area actually allocated for displaying the video image, which is at most height_vdr 464.

Width_window 468 is the total width of the window.

Width_displayRegion 470 is the width of a display region containing additional information about the video. In the exemplary user interface of FIG. 4, this value is fixed.

Width_vdr 472 is the width of the video display region, and occupies the portion of the width not occupied by width_displayRegion 470.

Width_vc 474 is the width of the video controls, and in a preferred embodiment is also of width width_vdr, since the video controls are contained within the video display region and in that embodiment are as wide as their container.

The relationships of these variables to each other in the exemplary embodiment of FIG. 4 are represented by equations as follows:

$$height\_window = height\_topUnusable + height\_bottomUnusable + height\_otherRegion + height\_vr$$

$$height\_vr = height\_vdr + height\_vc$$

$$width\_window = width\_vdr + width\_displayRegion$$

Note that FIG. 4 represents one particular embodiment of the user interface. For example, there is shown only one height_otherRegion 454, whereas there could be many such other non-video display regions, and such regions could be in different window locations. Thus, it is appreciated that many other user interface layouts are possible.

Method of Operation

Figure 5:
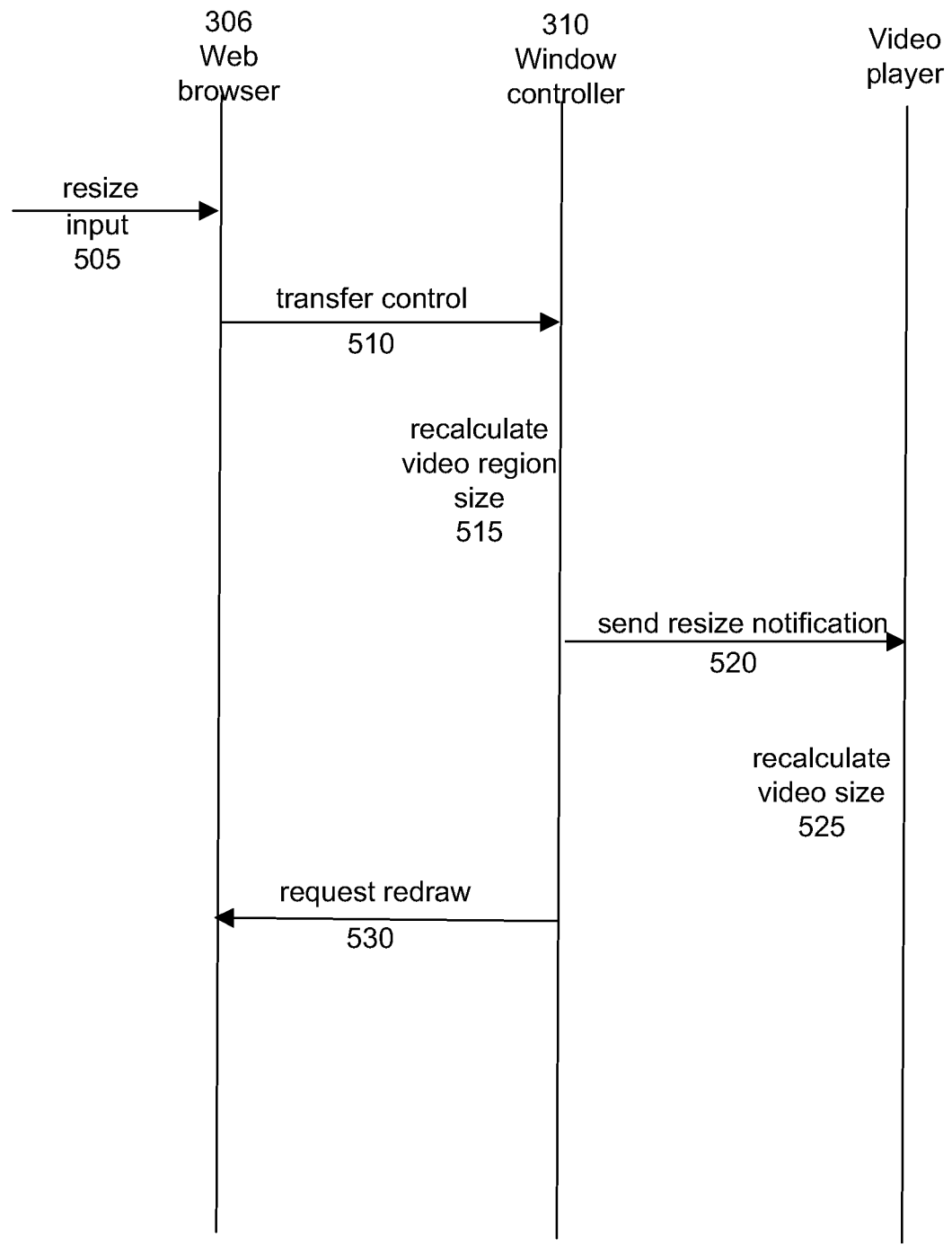
FIG. 5 is an event trace of the operation of a web browser and a video sharing web site.
Figure 6A:
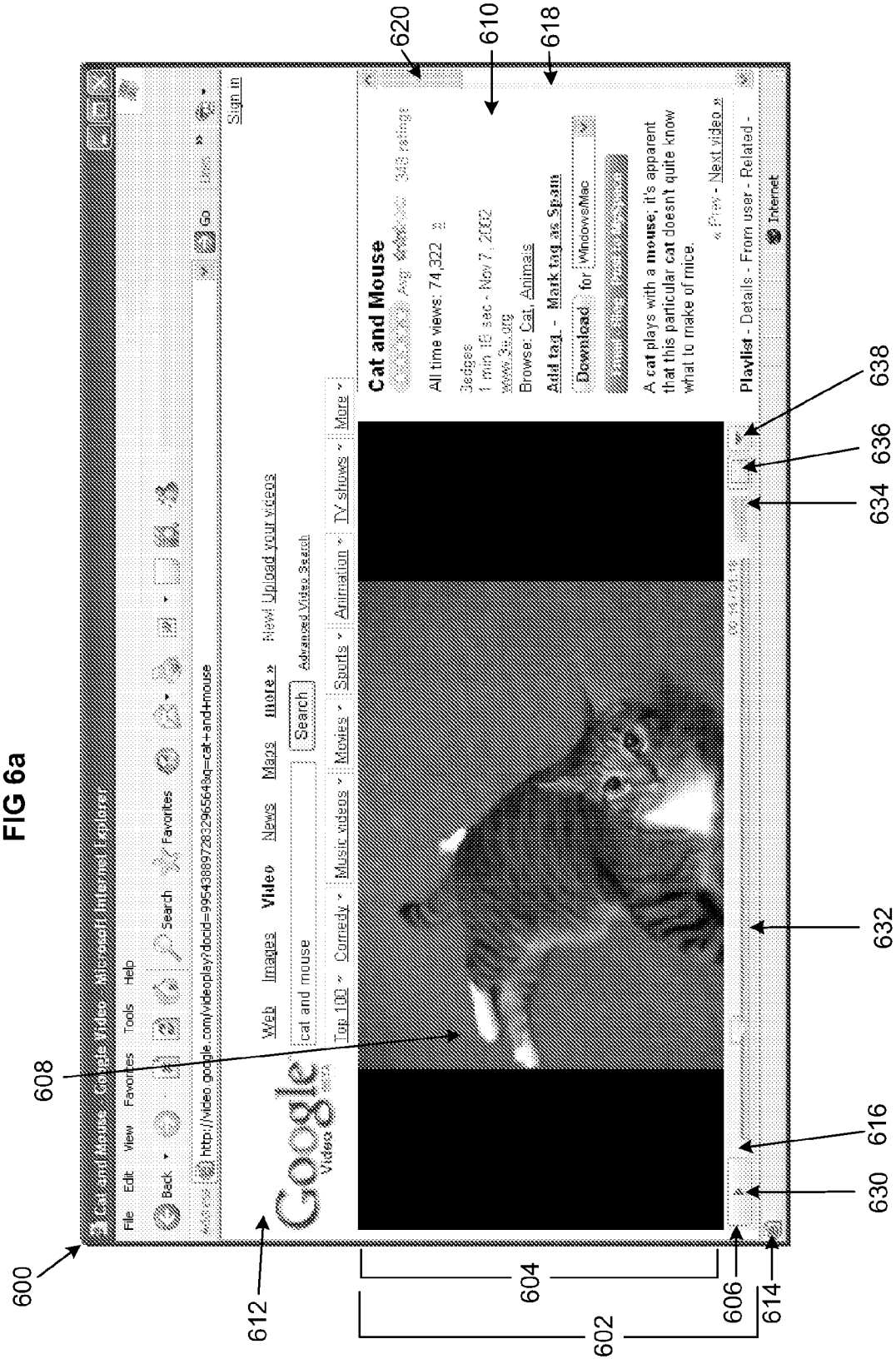
Figure 6C:
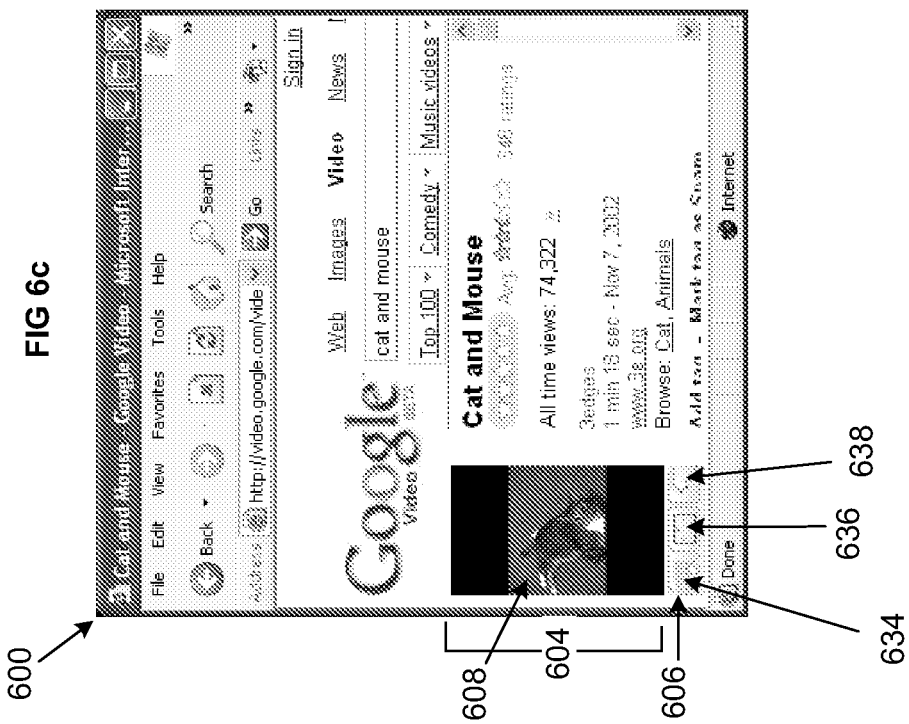

FIG. 5 illustrates an example event trace that occurs responsive to a window resize, described in terms of the variables of FIG. 4. FIGS. 6a to 6c illustrate how a user interface of a web browser 306 reacts in response to a series of window resize events, according to one embodiment in which the video is viewed within a web browser 306. Note that in the initial state of FIG. 5, the window of web browser 306 already contains a selected video, which may be either paused or playing. It should also be noted that the below calculations are used for sizing the user interface, not only in response to resize events, but also during the initial state, before any resize events have taken place.

FIG. 6a represents the web browser window 600 in an initial state, before a resize event. The data region 610 is located on the right-hand side of the browser window 600 and displays information about the current video 608, such as its title, average user rating, and description. The video region 602 includes the video display region 604, the video image 608 (which is the currently-displayed frame of the selected video), and the video control region 606. The video region 602 occupies height_vr 460, the vertical region between the bottom of the fixed search panel 612 and the top of the browser status bar 614, and width_vr 471, the horizontal region between the edge of the browser window 600 on the left and the data region 610 on the right. Within the video region 602, the video control region 606 is located at the bottom and contains user interface elements 616 providing a means of controlling video playback, including play/pause button 630, frame selection slider 632, volume control slider 634, full screen mode button 636, and drop-down options list 638. The video display region 604 is located in the remainder of the video region 602 not occupied by the video control region 606, and displays the video image 608 at the largest size consistent with maintaining the aspect ratio of the video as originally received by the video sharing site, so as to prevent cropping or stretching. The remainder of the video display region 604 not used to display the video image 608 is displayed in black. Note that in one embodiment, the video image 608 can be set to a fixed size, such as original size or double size, that does not vary along with the size of the window; thus, as video display region 604 increases in size beyond this fixed size, video image 608 will be surrounded by an increasingly large amount of black space. If the window is decreased below this fixed size, the video is scaled to fit the space available while maintaining its aspect ratio, without cropping or stretching.

One of skill in the art would readily appreciate that various aspects of the layout of the embodiment shown in FIG. 6a are design decisions, and that other designs are equally applicable for purposes of carrying out the present invention. For example, the data region 610 need not be at the right-hand side of the window, nor need the video control region 606 be directly below the video display region 604.

Referring again to FIG. 5, the web browser 306 receives an input 505 to resize. The input can be provided directly by the user (e.g., by mouse or keyboard actions), or by a programmatic event, such as an automatic screen resize or other system event.

The web browser 306 then detects that the window resize occurred and transfers control 510 to window controller 310, which causes the video to be resized 515 as discussed below. In one embodiment, the window controller 310 then executes code (e.g., JavaScript) that is provided as part of the video sharing web site and that recalculates 515 the appropriate width and height of the video region 602 and sends a notification 520 to the video player 308 of this video region size recalculation. The video player 308 then recalculates 525 the size of the video within the video region 602 so as to preserve the original aspect ratio and thus avoid image cropping.

These resize calculations 515 and 525 involve several computations, the details of which are now explained in terms of the variables illustrated in FIG. 4. Those of skill in the art will appreciate the following equations and operations are but one way of using the variables of FIG. 4 to obtain the desired results for the width and height of the video region as well as the size of the video.

Accordingly, in this embodiment, the window controller 310 determines the height and width of the video region 602, according to the formulas:

$$height\_vr = height\_window - height\_topUnusable - height\_bottomUnusable - height\_otherRegion, \text{ and}$$

$$width\_vr = width\_window - width\_displayRegion$$

The video player 308 determines the height of the video control region 606, height_vc, according to the fixed value previously chosen by the web page designer. The video player 308 determines the height of video display region 604, according to the formula:

$$height\_vdr = height\_vr - height\_vc$$

In one embodiment, the video control region 606 and video display region 604 that are contained within video region 602 inherit its width, but this is not a requirement of the invention. When determining the width of other regions, such regions may be created in terms of the text that they contain. For example, the width of data region 610 may be based on a fixed number of "m-dashes," a measurement based on the size of the current font, since this would allow displaying a desired amount of text. This technique makes it easier, for example, for the designer of a video sharing site to set the sizes of portions of the user interface with the needs of special groups in mind, such as those with impaired vision who need larger fonts. This m-dash width could easily be converted by window controller 310 to a pixel width by multiplying the width in m-dashes by the number of pixels per m-dash in the current font.

Next, with the size of video display region 604 determined, the video player 308 places video image 608 within it while still maintaining the original aspect ratio of the video so that no cropping of the image occurs. This involves comparing the aspect ratios (that is, the ratio of width to height) of video display region 604 and of the video. If the aspect ratio of the resized video display region 604 is greater than the aspect ratio of the video, then it is proportionally wider than the video itself. In order to maximize the video image size while still maintaining its aspect ratio, the window controller 310 scales the video image 608 by setting its height to the full height of video display region 604, and its width to the height of video display region 604 multiplied by the aspect ratio of the current video image. This causes the video image 608 to occupy the full height of video display region 604, and less than the entire width.

The calculation in cases where the aspect ratio of the resized video display region 604 is greater than the aspect ratio of the video is expressed according to the equations:

$$height\_vi_{new} = height\_vdr, \text{ and}$$

$$width\_vi_{new} = height\_vdr * (width\_vi/height\_{vi})$$

Similarly, the calculation in cases where the aspect ratio of the resized video display region 604 is less than or equal to than the aspect ratio of the video is expressed according to the equations:

$$width\_vi_{new} = width\_vdr, \text{ and}$$

$$height\_vi_{new} = width\_vdr * (height\_vi/width\_{vi})$$

Having performed the above resize calculations, video player 308 then displays the video image so as to fit within the video display region.

Finally, the window controller 310 requests 530 the web browser 306 to resize video region 602, and the web browser 306 in turn redraws 530 its window 600 so as to reflect the foregoing size changes to the user.

Referring now to FIG. 6b, it illustrates the same browser window as in FIG. 6a, but after the window has been reduced in width in response to a window resize event. Here, the data region 610 maintains its original width, and video region 602 is adjusted to accommodate the overall reduction in the window width. Of course, other designs are equally feasible for implementing the present invention. Video control region 606 has been reduced in width in keeping with video region 602, which contains it, but it maintains its height. Additionally, its user interface elements 616 begin to shrink and/or "float" over top of each other so as to remain present despite the reduced area, and thus remain accessible to the user: specifically, frame selection slider 632 has been reduced in width and has begun to float over play/pause button 630 while still leaving it accessible to a mouse click, and volume control slider 634, full screen mode button 636, and drop-down options list 638 have moved to the left to occupy the space vacated by frame selection slider 632. Thus, the user does not need to take additional actions, such as scrolling the video window up and down, in order to access the controls. The video image 608 has been resized in response to the overall window resize; note that even though only the width of the window was reduced from FIG. 6a, the height of video image 608 has been reduced significantly in order to maintain the video's original aspect ratio, resulting in portions of the video display region above and below the video image being left blank.

FIG. 6c illustrates the same browser window as in FIG. 6b, but after the window has further been resized again, with a substantial reduction in both width and height. As with FIG. 6b, the video display region 604 has been resized so as to occupy only the remaining space after the window has been reduced in size. The video control region 606 has been reduced in width so as to fit within the video display region 604, yet it retains its original height so that it remains visible and accessible to the user. Additionally, the video image 608 has been resealed so as to retain its original aspect ratio, even though its height and width have been reduced considerably. Finally, volume control slider 634, full screen mode button 636, and drop-down options list 638 have floated completely over top of play/pause button 630.

Figure 6D:
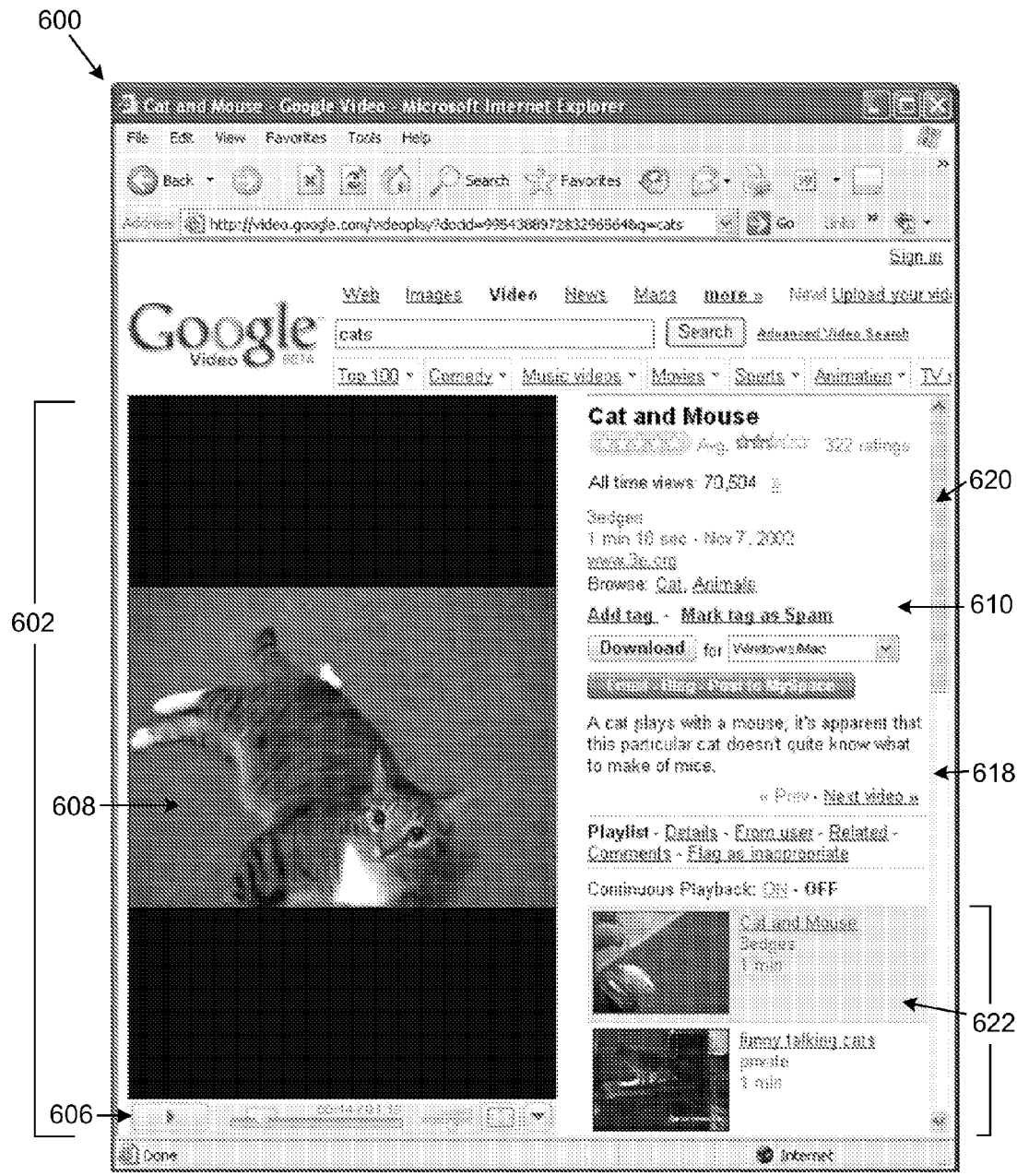
Figure 6E:
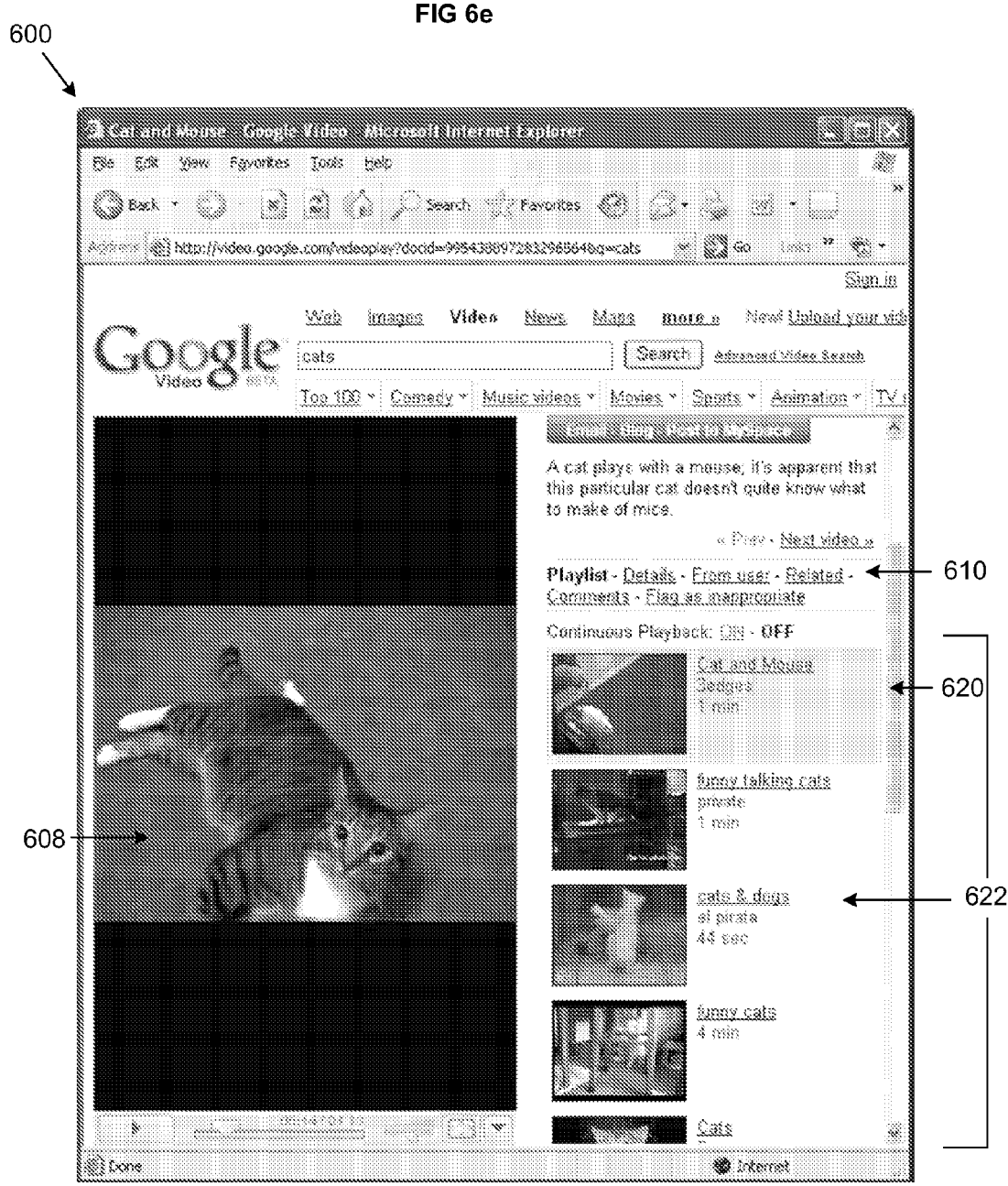

FIGS. 6d and 6e illustrate how the video image 608 remains fixed and visible, despite scrolling in other regions of the window. FIG. 6d represents an initial state of the browser window 600, before any scrolling has taken place. Note that the scroll control 620 of the vertical scrollbar 618 is at its highest location, and the topmost content of data region 610 is visible, but content lower down—such as video thumbnails 622 below the top two—is not. FIG. 6e represents the same window as that of FIG. 6d, but after the user has scrolled downward. The upper content of data region 610 has thus vanished, and a corresponding amount of the lower content has become visible, so that two additional video thumbnails 622 are shown in the display region 610. However, the scrolling of data region 610 is independent of the display of video region 602; thus, the video control region 606 and the video image 608 are not scrolled, but are displayed at the same location relative within the browser window as they were in FIG. 6d prior to the scroll event. This allows the user to continue viewing the video image, while concurrently accessing the additional information in the display region 610.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems. In one embodiment, the process steps and instructions are embodied in a computer program executable by a processor and stored by a computer readable memory. The computer-readable memory is a non-transitory, tangible storage medium, and can include, but is not limited to, hard disks, CD-ROMs, DVDs, flash memory, and the like.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of displaying a video image from a video playing in a window of a web browser, the method comprising:
    displaying the video image within a video region of the web browser window, the web browser capable of rendering HTML content within the window, the video region comprising a video display region for containing the video image at a first image size and a video control region comprising a plurality of video playback controls, the video display region having a first video display aspect ratio and the video image having an image aspect ratio different from the aspect ratio of the video display region;
    determining a first remainder of the video display region consisting of all of the video display region not used to display the video image;
    displaying the determined first remainder as a background within the video display region;
    displaying a video data region within the web browser window, the video data region comprising a title of the video image and a textual description of the video image;
    responsive to reduction in size of the web browser window while the video is being played:
        reducing the video region in size such that:
            the video region remains entirely visible in the web browser window, the video display region is reduced in size and has a second video display aspect ratio different from the first video display aspect ratio, and
            the video image is reduced in size to have a second image size less than the first image size and the same image aspect ratio, and to fit within the video display region,
        determining a second remainder of the reduced video display region consisting of all of the reduced video display region not used to display the video image at the second image size,
        displaying the determined second remainder as a background within the resized video display region, and
        maintaining the video data region at a size such that the title and the textual description of the video data region remain substantially legible; and
    displaying the resized web browser window, including displaying the video image at the second image size within the reduced video region and the title and displaying the textual description in the video data region.

2. The computer-implemented method of claim 1, wherein as the video region is reduced in size, the video control region is visible as long as the video display region is visible.

3. The computer-implemented method of claim 1, where the video region is reduced in size such that:
    the video control region has a predetermined constant height;
    the video display region has a height that is the usable height of the window, less the height of the video control region, and less the sum of the heights of any other regions in the user interface that are directly above or below the video region; and
    the video region width is that of the window, less the widths of any other regions directly to the left or the right of the video region.

4. The computer-implemented method of claim 1, further comprising, responsive to the first video display aspect ratio being greater than the image aspect ratio:
    maintaining the image aspect ratio by setting a height of the video image to a height of the video display region, and a width of the video image to the product of the height of the video display region and the image aspect ratio; and
    displaying the background as black rectangular regions within the video display region on a left side and on a right side of the video image.

5. The computer-implemented method of claim 1, further comprising, responsive to the first video display aspect ratio being less than or equal to the image aspect ratio:
  maintaining the image aspect ratio by setting a width of the video image to a width of the video display region, and a height of the video image to the product of the width of the video display region and the reciprocal of the image aspect ratio; and
  displaying the background as black rectangular regions within the video display region on a top side and on a bottom side of the video image.

6. The computer-implemented method of claim 1, further comprising, responsive to user input, maintaining the video region in a fixed position while scrolling another region of the window.

7. The computer-implemented method of claim 1, further comprising:
  calculating a width of the video data region based on a fixed number of m-dashes in a current font size.

8. The computer-implemented method of claim 1, wherein the video control region contains a play/pause control.

9. The computer-implemented method of claim 1, wherein the video control region contains a frame selection slider control.

10. The computer-implemented method of claim 1, wherein the video control region contains a full-screen mode control.

11. The computer-implemented method of claim 1, wherein the video control region contains controls for changing the resolution of the video image.

12. The computer-implemented method of claim 1, wherein the video control region contains a volume slider control.

13. The computer-implemented method of claim 1, wherein the video control region comprises a first subregion, a second subregion, and a third subregion, each subregion comprising one or more controls for controlling video playback, the method further comprising:
  responsive to a width of the video control region being reduced, reducing a width of the first subregion; and
  responsive to the first subregion being reduced to a predetermined width, moving the second subregion in a horizontal direction, such that the one or more controls of the second subregion are displayed overlaying a third subset of the controls.

14. A non-transitory computer readable memory storing a computer program executable by a processor, the computer program producing a web-based user interface for displaying a video image from a video playing in a window of a web browser, the web browser capable of rendering HTML content within the window, the web-based user interface comprising:
  a video region adapted to display the video image, the video region further comprising a video display region adapted to contain the video image at a first image size and a video control region comprising a plurality of video playback controls, the video display region having a first video display aspect ratio and the video image having an image aspect ratio different from the aspect ratio of the video display region, the video display region having a first remainder consisting of all of the video display region that is not used to display the video image and that is displayed as background;
  a video data region adapted to display textual information about the video image, the displayed textual information comprising a title of the video image and a textual description of the video image; and
  an executable process that is adapted to, responsive to reduction in size of the web browser window while the video is being played:
    reduce the video region in size such that:
      the video region remains entirely visible in the web browser window,
      the video display region is reduced in size and has a second video display aspect ratio different from the first video display aspect ratio, and
      the video image is reduced in size to have a second image size less than the first image size and the same image aspect ratio, and to fit within the video display region;
    determine a second remainder of the reduced video display region consisting of all of the reduced video display region not used to display the video image at the second image size;
    display the determined second remainder as a background within the resized video display region;
    maintain the video data region at a size such that the title and the textual description of the video data region remain substantially legible; and
    display the resized web browser window, including displaying the video image at the second image size within the reduced video region and the title and displaying the textual description in the video data region.

15. The computer program product of claim 14, wherein as the video region is reduced in size, the video control region is visible as long as the video display region is visible.

16. The computer program product of claim 14, where the executable process reduces a size of the video region such that:
  the video control region has a predetermined constant height;
  the video display region has a height that is the usable height of the window, less the height of the video control region, and less the sum of the heights of any other regions in the user interface that are directly above or below the video region; and
  the video region width is that of the window, less the widths of any other regions directly to the left or the right of the video region.

17. The computer program product of claim 14, where responsive to an aspect ratio of the video display region being greater than the aspect ratio of the video image, the executable process:
  maintains the aspect ratio of the video image by setting a height of the video image to a height of the video display region, and a width of the video image to the product of the height of the video display region and the aspect ratio of the video image; and
  displays the background as black rectangular regions within the video display region on a left side and on a right side of the video image.

18. The computer program product of claim 14, where responsive to the first video display aspect ratio being less than or equal to the image aspect ratio, the executable process:
  maintains the image aspect ratio of the video image by setting a width of the video image to a width of the video display region, and a height of the video image to the product of the width of the video display region and the reciprocal of the image aspect ratio; and
  displays the background as black rectangular regions within the video display region on a top side and on a bottom side of the video image.

19. The computer program product of claim 14, where the executable process maintains the video region in a fixed position while scrolling another region of the window.

20. The computer program product of claim 14, wherein: the executable process calculates a width of the video data region based on a fixed number of m-dashes in a current font size.

21. The computer program product of claim 14, wherein the video control region contains a frame selection slider control.

22. The computer program product of claim 14, wherein the video control region contains a full-screen mode control.

23. The computer program product of claim 14, wherein the video control region contains a volume slider control.

24. The computer program product of claim 14, wherein the video control region comprises a first subregion, a second subregion, and a third subregion, each subregion comprising one or more controls for controlling video playback, and wherein:
  responsive to a width of the video control region being reduced, the executable process reduces a width of the first subregion; and
  responsive to the executable process reducing the first subregion to zero width, the executable process moves the second subregion in a horizontal direction, such that the one or more controls of the second subregion are displayed overlaying a third subset of the controls.

25. The method of claim 1, wherein the resizing of the web browser window is performed by a user using a graphical user interface.

26. The method of claim 13, wherein the predetermined width is a width of zero.

27. A computer-implemented method of displaying a video image from a video playing in a window of a web browser, the method comprising:
  displaying the video image within a video region of the web browser window, the web browser capable of rendering HTML content within the window, the video region comprising a video display region for containing the video image at a first image size, the video display region having a first video display aspect ratio and the video image having an image aspect ratio different from the aspect ratio of the video display region;
  determining a first remainder of the video display region consisting of all of the video display region not used to display the video image;
  displaying the determined first remainder as a background within the video display region;
  responsive to reduction in size of the web browser window while the video is being played:
    reducing the video region in size such that:
      the video region remains entirely visible in the web browser window,
      the video display region is reduced in size and has a second video display aspect ratio different from the first video display aspect ratio, and
      the video image is reduced in size to have a second image size less than the first image size and the same image aspect ratio, and to fit within the video display region,
    determining a second remainder of the reduced video display region consisting of all of the reduced video display region not used to display the video image at the second image size,
    displaying the determined second remainder as a background within the resized video display region; and
  displaying the resized web browser window, including displaying the video image at the second image size within the reduced video region.

* * * * *